United States Patent [19]

Meyn

[11] 4,035,867
[45] July 19, 1977

[54] APPARATUS FOR REMOVING THE NECK FROM A FOWL

[76] Inventor: Pieter Meyn, Noordeinde 72, Oostzaan, Netherlands

[21] Appl. No.: 662,928

[22] Filed: Mar. 1, 1976

[30] Foreign Application Priority Data

Mar. 5, 1975 Netherlands .................... 7502569

[51] Int. Cl.² .............................................. A22C 3/08
[52] U.S. Cl. ..................................................... 17/11
[58] Field of Search ..................... 17/11, 1 R, 12, 45

[56] References Cited

U.S. PATENT DOCUMENTS 3,965,534 2/1975 Harben, Jr. .............................. 17/11

FOREIGN PATENT DOCUMENTS 2,007,953 10/1970 Germany ................................ 17/11

Primary Examiner—Robert Peshock

[57] ABSTRACT

An apparatus for removing the neck of an plucked, headless fowl hanging by the legs from a hook of a overhead conveyor. The apparatus is built in the manner of a merry-go-round and has a number of clamping units, regularly spaced about the circumference of the apparatus and moving along with the conveyor, each unit being slidably mounted on a vertical slide bar and adapted to grip the fowl's neck, so that the vertebrae of the neck are separated from the remaining part of the fowl's spine without damage to the skin of the neck. After separating the vertebrae the unit moves downwards relative to the fowl, so that the vertebrae are at least partially pushed out of the skin together with the meat adhering thereto. Finally the unit releases the fowl's neck, moves back to its upper position and its slide bar and is ready for removing another fowl's neck.

4 Claims, 2 Drawing Figures

APPARATUS FOR REMOVING THE NECK FROM A FOWL

FIELD OF THE INVENTION

The invention relates to an apparatus for removing the neck of a headless, plucked fowl hanging of the ankle joints from a conveyor hook.

Background

In preparing fowl for sale it is normal practice to separate the vertebrae of the neck together with the meat adhering thereto from the remaining part of the spinal column of the fowl, without removing the skin of the the neck. Usually the skinless neck is separately added to the fowl before it is sold, together with the heart, the gizzard and the liver.

Summary of the Invention

The invention has as its object the provision of an apparatus for automatically separating the vertebrae of the neck and the meat adhering thereto from the remaining part of the spinal column of a fowl in a simple and efficient manner.

According to the invention this object is attained by an apparatus of the type referred to, characterized by at least one slide block moving along with the conveyor and vertically movable up and down relative to the fowl, said slide block being provided with a laterally extending forked clamping member and a pivotable arm cooperating with the clamping member in such manner, that with the slide block in an upper position, the fowl's neck is pressed into the clamping member by the arm, so that the vertebrae of the neck are separated from the remaining part of the spinal column of the fowl without damage to the skin of the neck, whereafter the slide block is moved downwards, so that the vertebrae of the neck, together with the meat adhering thereto, are at least partially pulled out of the skin through the opening previously formed by the removal of the fowl's head, and finally with the slide block in a lower position, the neck of the fowl is released from the clamping member by the arm.

Preferably, the apparatus is built in the manner of a merry-go-round and is provided with a plurality of sliding blocks regularly spaced about the circumference of the apparatus, with the same spacing as the spacing of the conveyor hangers and each slide mounted on a vertical sliding bar, the slide blocks and the respective pivoting arms having followers cooperating with stationary camming tracks of such shape, that the movements of the slide blocks and the arms are executed in the desired sequential order.

Advantageously, each of the pivotable arms is provided with two followers, each cooperating with a separate camming track in such manner, that the pivoting arms are moved in one direction by means of one of the followers, and in the other direction by means of the other follower.

Preferably, the sliding bars of the sliding blocks are attached to a horizontal driving wheel, the outer edge of which is provided with notches for receiving conveyor hangers, each carrying one of the conveyor hooks, so that the apparatus is driven by the conveyor.

As during the slaughter of the fowl it is check whether the fowl is healthy, so that unhealthy fowl may be destroyed, it may be desirable, in case the examination takes place after the removal of the necks, to choose the movements of the slide blocks in such manner that the vertebrae of the neck are not fully pushed out of the skin, so that the neck of unhealthy fowl may be destroyed together with the fowl theirselves. If desirable the necks of the healthy fowl may easily be pulled all the way out of the skin after the health examination.

BRIEF DESCRIPTION OF THE DRAWING

Further features and advantages of the invention will become apparent from the following description of the embodiment of the invention taken with the accompanying drawings, in which.

DESCRIPTION OF THE PREFERRED EMBODIMENT

Figure 1:
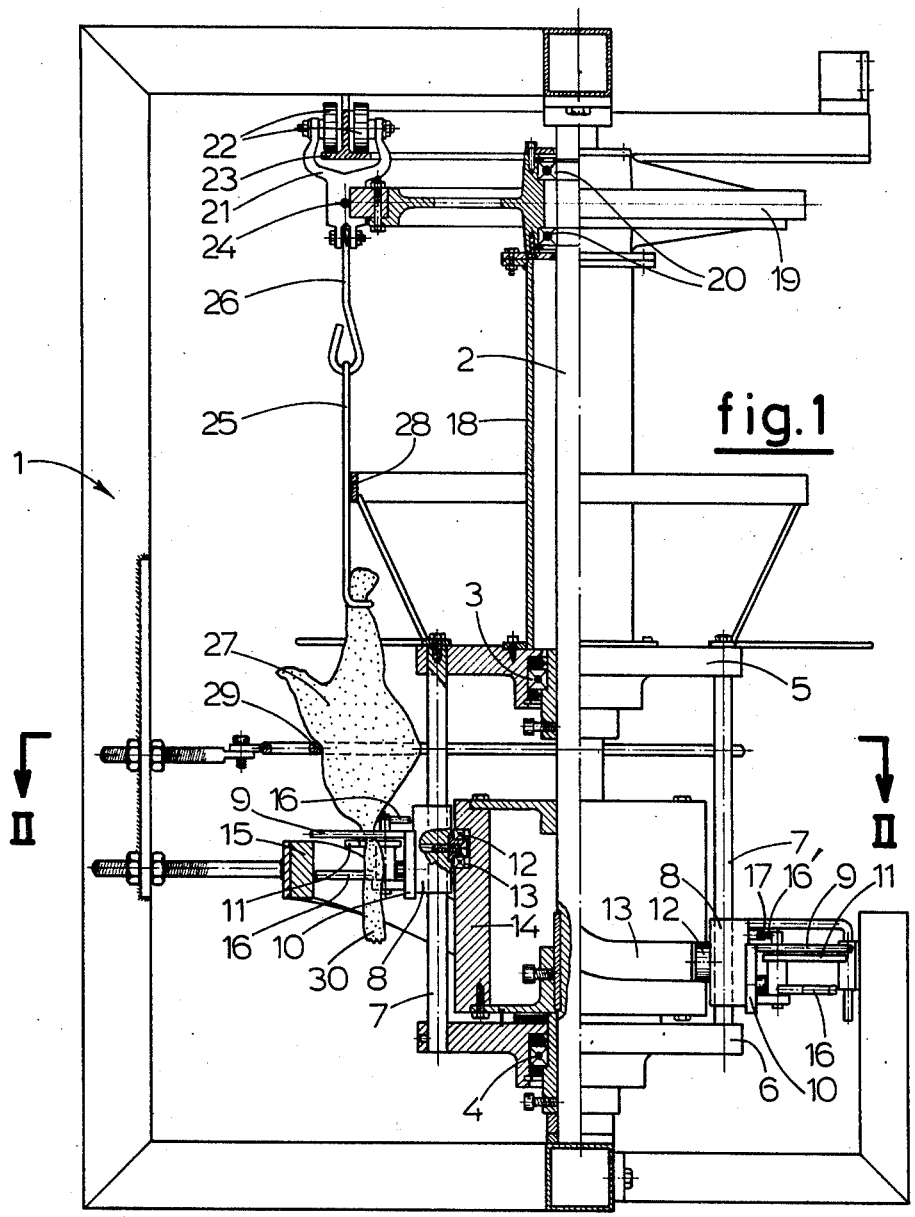
FIG. 1 is a partial cross-sectional side view of an apparatus according to the invention.
Figure 2:
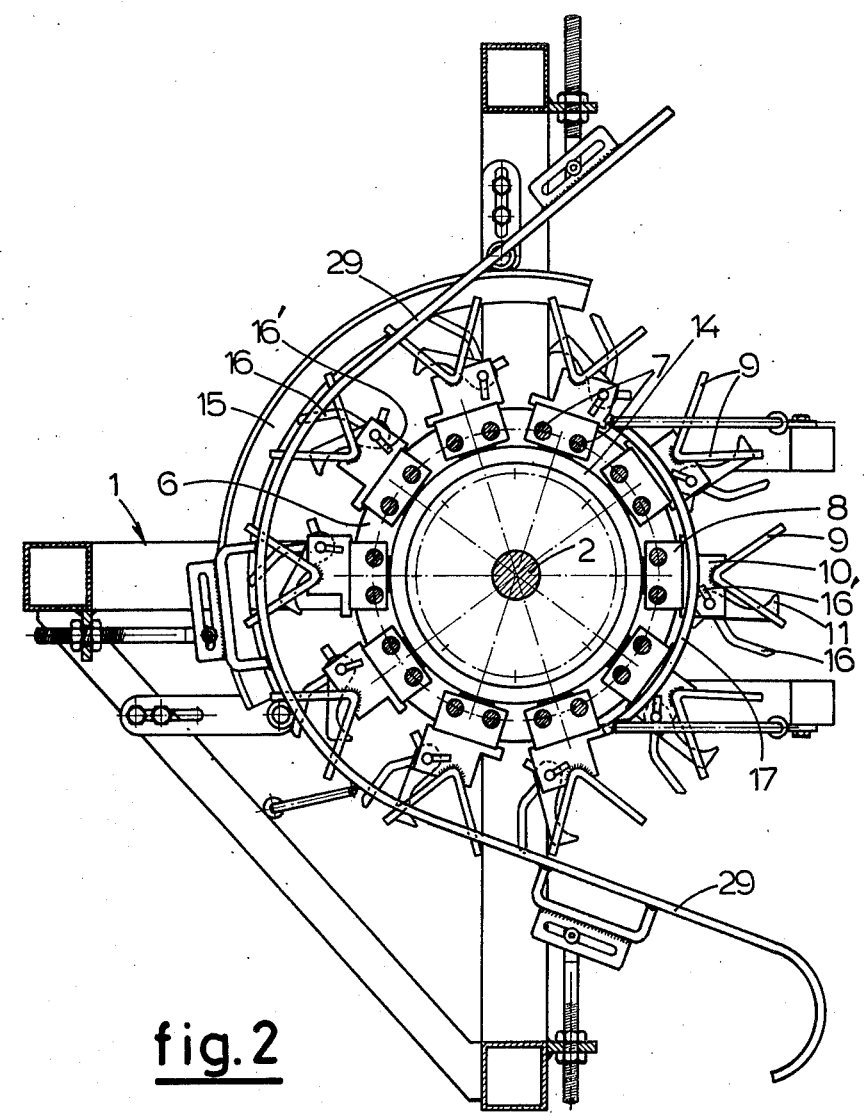
FIG. 2 is a cross section taken on line II—II in FIG. 1.

The apparatus according to the invention for removing the neck of a fowl is built in the manner of a merry-go-round as can be seen from the drawings. The apparatus comprises a frame 1 with a vertical central shaft 2, on which two circular supports 5 and 6 are rotatably mounted by means of ball bearings 3 and 4 respectively. A plurality of vertical slide bars 7 are attached between the supports 5 and 6, and regularly spaced about the circumference of the supports. A sliding block 8 is vertically slidably mounted on each of the sliding bars 7, which each comprises two parallel sliding rods.

Each slide block 8 is provided with a radially extending forked clamping member 9 and a pivotable arm 11 rotatably mounted about a vertical axis in the foot 10 of the clamping member 9 and cooperating therewith. Each of the slide blocks 8 is further provided with a follower 12 radially extending towards the central shaft and cooperating with a camming track 13 formed as a stationary support member 14. Each of the pivotable arms 11 is provided with a first follower 16 cooperating with a stationary camming track 15 and a second follower 16' cooperating with a stationary camming track 17. Both followers serve for pivoting the arms 11 relative to the clamping members 9.

The upper support 5 is connected with a horizontal driving wheel 19 by means of a vertical tube 18. The driving wheel is rotatably mounted on the upper part of the central shaft 2 by means of bearings 20. The outer edge of the driving wheel 19 is provided with notches for receiving the hangers 21 of a conveyor which are movable by means of rollers 22 along a rail 23 attached to the frame 1. The hangers 21 are attached to a pulling cable 24 and each carries a hook 25, which is connected to the hanger 21 by means of a connecting rod 26. Thus the driving wheel 19, together with the elements connected therewith, is driven by the conveyor. The spacing of the notches and the spacing of the slide blocks 8, lying directly below the notches, correspond with the spacing of the conveyor hangers 21.

The operation of the apparatus is as follows. The fowl 27, the neck of which is to be removed, is hung by the ankle joints from a conveyor hook 25 and is tangentially moved towards the apparatus by the conveyor. Upon reaching the conveyor, the hook 25 and the fowl 27 are brought into contact with guide rails 28 and 29, so that the fowl 27 is brought into the correct position relative to the apparatus and the neck 30 is received in one of the forked clamping members 9 of the apparatus. Upon further rotation of the clamping member, the follower 16 of the pivotable arm 11 connected to the clamping member is brought into contact with the camming track 15, so that the arm is pivoted towards the neck 30 of the fowl 27 and the neck 30 is pressed into the clamping member by the arm. Because of the clamping effect the vertebrae of the neck of the fowl 27 are separated from the spinal column of the fowl without damage to the skin of the neck. Hereafter the sliding block 8 of the clamping member 9 in question is moved down along the slide bar 7, because of the cooperation of the follower 12 of the slide block 8 and the camming track 13, so that the vertebrae of the neck of the fowl 27, together with the meat adhering thereto, are pushed from the skin through the opening previously formed by the removal of the fowl's head. Finally the follower 16' of the arm 11 is brought into contact with the camming track 17, so that the arm 11 is pivoted back to its orginal position and the fowl is released again, to be transported away from the apparatus by the conveyor.

It will be understood that if so desired, it would be possible to prevent the vertebrae of the neck from being pushed all the way out of the fowl's skin by means of a suitable shape of the camming tracks. In that case the vertebrae will remain dangling from the end of the skin of the neck.

I claim:

1. Apparatus for removing the neck of headless, plucked fowls hanging by the ankle joints from spaced hooks of an overhead conveyor, comprising a frame; a merry-go-round assembly on said frame including: a plurality of vertical slide bars regularly spaced about the circumference of the merry-go-round with the same spacing as the spacing of the hook of said conveyor; means for moving said slide bar along with said conveyor; a slide block reciprocably mounted on each said slide bar; means for sliding each said slide block up and down along said slide bar, each said slide block being provided with a forked clamping member laterally extending towards said conveyor, a pivotable arm connected to said clamping member for cooperating therewith the means for moving said arm towards and away from said clamping member in such manner that with the slide block in an upper position the arm is moved towards the clamping member thereby pressing the fowl's neck into said clamping member, so that the vertebrae of the neck are separated from the remaining part of the fowl's spinal column without damage to the fowl's skin; whereafter said slide block is moved downwards along said slide bar, so that said vertebrae together with the meat adhering thereto are at least partially pulled out of the skin of the neck through the opening previously provided by the removal of the fowl's head; and finally, with said slide block in a lower position, said arm is moved away from said clamping element thereby releasing the fowl; said slide blocks and said pivotable arms being provided with followers cooperating with stationary camming tracks attached to said frame, said camming tracks being so shaped that the movements of said slide blocks and said pivotable arms are executed in the desired sequential order.

2. Apparatus according to claim 1, wherein said merry-go-round assembly comprises a horizontal driving wheel rotatable about a vertical axis, said slide bars being attached to said horizontal driving wheel for rotation therewith about said vertical axis, said drriving wheel being supported by said frame and having an outer edge provided with a plurality of notches, said notches having the same circumferential spacing as said sliding blocks and being adapted to receive conveyor hangers, each carrying one of the conveyor hooks, so that the drivng wheel is driven by said conveyor.

3. Apparatus according to claim 1, wherein each of said pivotable arms is provided with two followers, each cooperating with a separate camming track such that said pivotable arms are moved in one direction by means of one of said followers and in the other direction by means of the other of said followers.

4. Apparatus according to claim 3, wherein said merry-go-round assembly comprises a horizontal driving wheel rotatable about a vertical axis, said slide bars being attached to said horizontal driving wheel for rotation therewith about said vertical axis, said driving wheel being supported by said frame and having an outer edge provided with a plurality of notches, said notches having the same circumferential spacing as said slide blocks and being adapted to receive conveyor hangers, each carrying one of the conveyor hooks, so that the driving wheel is driven by said conveyor.

* * * * *